(12) United States Patent
Wang et al.

(10) Patent No.: US 12,500,681 B2
(45) Date of Patent: Dec. 16, 2025

(54) TIME SYNCHRONIZATION METHOD AND APPARATUS FOR VEHICLE-MOUNTED DEVICE, VEHICLE-MOUNTED DEVICE, AND STORAGE MEDIUM

(71) Applicant: GUANGZHOU ASENSING TECHNOLOGY CO., LTD., Guangzhou (CN)

(72) Inventors: Jiede Wang, Guangzhou (CN); Leijin Han, Guangzhou (CN); Chunhui Situ, Guangzhou (CN); Jing Pang, Guangzhou (CN)

(73) Assignee: GUANGZHOU ASENSING TECHNOLOGY CO., LTD., Guangzhou (CN)

( * ) Notice: Subject to any disclaimer, the term of this patent is extended or adjusted under 35 U.S.C. 154(b) by 321 days.

(21) Appl. No.: 18/454,993

(22) Filed: Aug. 24, 2023

(65) Prior Publication Data

US 2023/0396349 A1 Dec. 7, 2023

Related U.S. Application Data

(63) Continuation of application No. PCT/CN2022/077925, filed on Feb. 25, 2022.

(30) Foreign Application Priority Data

Feb. 25, 2021 (CN) .......................... 202110214124.X

(51) Int. Cl.
*H04J 3/06* (2006.01)
*G07C 5/00* (2006.01)

(52) U.S. Cl.
CPC ............ *H04J 3/0638* (2013.01); *G07C 5/008* (2013.01)

(58) Field of Classification Search
CPC ...... G07C 5/008; H04J 3/0638; H04J 3/0664; H04L 12/12; H04L 12/40013; H04L 67/12; H04W 56/002; Y02D 30/70
(Continued)

(56) References Cited

U.S. PATENT DOCUMENTS

| 2009/0052431 A1* | 2/2009 | Kroener | ............... H04J 3/0664 370/350 |
| 2015/0112545 A1* | 4/2015 | Binion | ..................... G07C 5/12 701/1 |

(Continued)

FOREIGN PATENT DOCUMENTS

| CN | 101631016 A | 1/2010 |
| CN | 107635280 A | 1/2018 |

(Continued)

OTHER PUBLICATIONS

First Office Action issued in counterpart Chinese Patent Application No. 202110214124.X, dated Oct. 10, 2022.
(Continued)

*Primary Examiner* — Robert J Lopata
(74) *Attorney, Agent, or Firm* — Westbridge IP LLC

(57) ABSTRACT

Disclosed are a time synchronization method and an apparatus for a vehicle-mounted device, a vehicle-mounted device, and a storage medium. The time synchronization method including: receiving first communication data transmitted by the second vehicle-mounted device, and recording a first receiving time; performing coarse time alignment on the first vehicle-mounted device based on the data generation time in the first communication data; after coarse time alignment is performed on the first vehicle-mounted device, receiving second communication data transmitted by the second vehicle-mounted device, and recording a second receiving time; determining, based on the first receiving time, the second receiving time, and the data transmitting
(Continued)

time, a synchronization time at which the first vehicle-mounted device and the second vehicle-mounted device are synchronized; performing time synchronization on the first vehicle-mounted device based on the synchronization time.

14 Claims, 3 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2016/0353399 | A1* | 12/2016 | Zhao | ........................ H04W 4/70 |
| 2017/0063704 | A1* | 3/2017 | Krinsky | ................. H04W 4/029 |
| 2020/0295966 | A1* | 9/2020 | Leng | ........................ H04L 12/40 |
| 2021/0160803 | A1* | 5/2021 | Bilstad | .................. H04L 7/0012 |
| 2021/0382158 | A1* | 12/2021 | Bakka | ................ H04W 56/0015 |
| 2022/0046561 | A1* | 2/2022 | Huang | ................. H04W 56/001 |
| 2022/0131773 | A1* | 4/2022 | Deen | .................... G06F 16/2322 |

FOREIGN PATENT DOCUMENTS

| | | |
|---|---|---|
| CN | 110351823 A | 10/2019 |
| CN | 111224733 A | 6/2020 |
| CN | 111245593 A | 6/2020 |
| CN | 111585682 A | 8/2020 |
| CN | 113037416 A | 6/2021 |
| JP | 2011257300 A | 12/2011 |

OTHER PUBLICATIONS

International Search Report issued in corresponding PCT Application No. PCT/CN2022/077925, dated May 27, 2022.
Written Opinion issued in corresponding PCT Application No. PCT/CN2022/077925, dated May 27, 2022.

* cited by examiner

TIME SYNCHRONIZATION METHOD AND APPARATUS FOR VEHICLE-MOUNTED DEVICE, VEHICLE-MOUNTED DEVICE, AND STORAGE MEDIUM

CROSS-REFERENCE TO RELATED APPLICATIONS

This application is a continuation of International Application No. PCT/CN2022/077925, filed on Feb. 25, 2022, which claims priority to Chinese Patent Application No. 202110214124.X, filed on Feb. 25, 2021. The disclosures of the aforementioned applications are hereby incorporated by reference in their entireties.

TECHNICAL FIELD

This application relates to the field of computer technologies, and specifically, to a time synchronization method and a time synchronization apparatus for a vehicle-mounted device, a vehicle-mounted device, and a storage medium.

BACKGROUND

With the rapid development of the modern vehicle industry, intelligent driving has currently become a development trend of the vehicle industry. Intelligent driving is an important breakthrough combining the industrial revolution and informatization, which can change a flow mode of people, resource elements, and products, and dramatically change human life. Intelligent driving refers to a technology in which a machine assists a person in driving, and completely replaces a human driver in a special case.

In a related technology, technologies such as machine vision, satellite positioning, and laser radar positioning are widely applied to intelligent driving. During implementation of intelligent driving, the foregoing technologies require a plurality of vehicle-mounted devices to work cooperatively. However, there is signal delay in signal fusion in the plurality of vehicle-mounted devices, which causes positioning errors and affects safety of autonomous driving. Therefore, currently there is a problem of signal time being out of synchronization between vehicle-mounted devices.

SUMMARY

Objectives of embodiments of the present application are to provide a time synchronization method and an apparatus for a vehicle-mounted device, a vehicle-mounted device, and a storage medium, so as to resolve a problem of signal time being out of synchronization between vehicle-mounted devices.

According to a first aspect, an embodiment of the present application provides a time synchronization method for a vehicle-mounted device, applied to a first vehicle-mounted device, where the first vehicle-mounted device is in communication connection with a second vehicle-mounted device. The method includes:

receiving first communication data transmitted by the second vehicle-mounted device, and recording a first receiving time at which the first communication data is received, where the first communication data includes a data generation time of the first communication data;

performing coarse time alignment on the first vehicle-mounted device based on the data generation time;

after coarse time alignment is performed on the first vehicle-mounted device, receiving second communication data transmitted by the second vehicle-mounted device, and recording a second receiving time at which the second communication data is received, where the second communication data includes a data transmitting time of the first communication data;

determining, based on the first receiving time, the second receiving time, and the data transmitting time, a synchronization time at which the first vehicle-mounted device and the second vehicle-mounted device are synchronized; and performing time synchronization on the first vehicle-mounted device based on the synchronization time.

In the embodiment, first communication data transmitted by a second vehicle-mounted device is received, a first receiving time is recorded, and coarse time alignment is performed on a first vehicle-mounted device based on data generation time in the first communication data, so that time synchronization is preliminarily implemented on the first vehicle-mounted device. After coarse time alignment is performed on the first vehicle-mounted device, second communication data transmitted by the second vehicle-mounted device is received, a second receiving time is recorded, and a synchronization time at which the first vehicle-mounted device and the second vehicle-mounted device are synchronized is determined based on the first receiving time, the second receiving time, and the data transmitting time, so that time synchronization correction is performed based on the synchronization time on the first vehicle-mounted device on which time synchronization is preliminarily implemented, thereby improving synchronization accuracy.

In an embodiment, the determining, based on the first receiving time, the second receiving time, and the data transmitting time, a synchronization time at which the first vehicle-mounted device and the second vehicle-mounted device are synchronized includes:

calculating, according to a preset calculation formula, the synchronization time at which the first vehicle-mounted device and the second vehicle-mounted device are synchronized, where the calculation formula is: $Tre=(T2r-T1r)+T2$, $Tre$ is the synchronization time, $T2r$ is the second receiving time, $T1r$ is the first receiving time, and $T2$ is the data transmitting time.

In the embodiment, a time difference between the first vehicle-mounted device and the second vehicle-mounted device is calculated based on the two receiving times of the communication data, so that device hardware does not need to be changed, and device time synchronization is implemented at a low cost.

In an embodiment, the performing time synchronization on the first vehicle-mounted device based on the synchronization time includes:

performing, based on a preset Kalman filter, error correction on the synchronization time to obtain a target synchronization time; and synchronizing a time of the first vehicle-mounted device with the target synchronization time.

In the embodiment, a synchronization time is further corrected by using the Kalman filter, so as to correct error impact caused by a transmission delay and an interrupt delay, further improve time synchronization accuracy, and improve anti-interference performance in a time synchronization process.

In an embodiment, the performing, based on a preset Kalman filter, error correction on the synchronization time to obtain a target synchronization time includes:

constructing an observation vector of the Kalman filter based on the synchronization time and a clock unit of the first vehicle-mounted device;

determining a state vector of the Kalman filter based on a current time, a time increment, and a preset transmission delay of the first vehicle-mounted device; and updating the synchronization time based on the observation vector and the state vector to obtain the target synchronization time.

In the embodiment, the current time, the time increment, and the preset transmission delay are used as state vectors to correct error impact of an interrupt delay of communication data on a synchronization time, thereby improving time synchronization accuracy.

In an embodiment, the updating the synchronization time based on the observation vector and the state vector to obtain the target synchronization time includes:

calculating a state transition matrix of the Kalman filter based on the state vector;

updating a covariance matrix of the state vector according to the state transition matrix;

calculating a Kalman gain matrix of the Kalman filter based on the covariance matrix; and updating the synchronization time based on the observation vector and the Kalman gain matrix to obtain the target synchronization time.

In the embodiment, an observation matrix defines a change rule of the observation vector varying with states, the synchronization time is a linear function of a local clock, and a scale and an offset of the local clock are included in a local clock error, so that adverse impact of local clock error on the synchronization time is corrected by using the Kalman filter.

According to a second aspect, an embodiment of the present application provides a time synchronization method for a vehicle-mounted device, applied to a second vehicle-mounted device, and the second vehicle-mounted device is in communication connection with one or more first vehicle-mounted devices. The method includes:

transmitting first communication data to the first vehicle-mounted device, where the first communication data includes a data generation time of the first communication data, the first communication data is used by the first vehicle-mounted device to record a first receiving time at which the first communication data is received, and the data generation time is used for coarse time alignment performed on the first vehicle-mounted device; and after coarse time alignment is performed on the first vehicle-mounted device, transmitting second communication data to the first vehicle-mounted device, where the second communication data is used by the first vehicle-mounted device to record a second receiving time at which the second communication data is received, the second communication data includes a data transmitting time of the first communication data, and the first receiving time, the second receiving time, and the data transmitting time are used by the first vehicle-mounted device to determine a synchronization time at which the first vehicle-mounted device and the second vehicle-mounted device are synchronized, and perform time synchronization based on the synchronization time.

According to a third aspect, an embodiment of the present application provides a time synchronization apparatus for a vehicle-mounted device, applied to a first vehicle-mounted device, where the first vehicle-mounted device is in communication connection with a second vehicle-mounted device. The apparatus includes:

a first receiving module, configured to: receive first communication data transmitted by the second vehicle-mounted device, and record a first receiving time at which the first communication data is received, where the first communication data includes a data generation time of the first communication data;

an alignment module, configured to perform coarse time alignment on the first vehicle-mounted device based on the data generation time;

a second receiving module, configured to: after coarse time alignment is performed on the first vehicle-mounted device, receive second communication data transmitted by the second vehicle-mounted device, and record a second receiving time at which the second communication data is received, where the second communication data includes a data transmitting time of the first communication data;

a determining module, configured to determine, based on the first receiving time, the second receiving time, and the data transmitting time, a synchronization time at which the first vehicle-mounted device and the second vehicle-mounted device are synchronized; and a synchronization module, configured to perform time synchronization on the first vehicle-mounted device based on the synchronization time.

According to a fourth aspect, an embodiment of the present application provides a time synchronization apparatus for a vehicle-mounted device, applied to a second vehicle-mounted device, and the second vehicle-mounted device is in communication connection with one or more first vehicle-mounted devices. The apparatus includes:

a first transmitting module, configured to transmit first communication data to a first vehicle-mounted device, where the first communication data includes a data generation time of the first communication data, the first communication data is used by the first vehicle-mounted device to record a first receiving time at which the first communication data is received, and the data generation time is used for coarse time alignment performed on the first vehicle-mounted device; and a second transmitting module, configured to: after coarse time alignment is performed on the first vehicle-mounted device, transmit second communication data to the first vehicle-mounted device, where the second communication data is used by the first vehicle-mounted device to record a second receiving time at which the second communication data is received, the second communication data includes a data transmitting time of the first communication data, and the first receiving time, the second receiving time, and the data transmitting time are used by the first vehicle-mounted device to determine a synchronization time at which the first vehicle-mounted device and a second vehicle-mounted device are synchronized, and perform time synchronization based on the synchronization time.

According to a fifth aspect, an embodiment of the present application provides a vehicle-mounted device, including a memory and a processor. The memory is configured to store a computer program, and the processor runs the computer program to cause the vehicle-mounted device to perform the time synchronization method according to the first aspect or the second aspect.

According to a sixth aspect, an embodiment of the present application provides a computer-readable storage medium on which a computer program is stored. When the computer program is executed by a processor, the time synchronization method according to the first aspect or the second aspect is implemented.

It may be understood that, for beneficial effects of the second aspect to the sixth aspect, reference may be made to the related description in the first aspect, and details are not repeated herein.

BRIEF DESCRIPTION OF THE DRAWINGS

To describe the technical solutions in embodiments of the present application more clearly, the following briefly describes the accompanying drawings required in the embodiments of the present application. It should be understood that the accompanying drawings in the following description show some embodiments of the present application, and therefore should not be taken as limiting the scope. A person of ordinary skill in the art may still derive other drawings from these accompanying drawings without creative efforts.

DETAILED DESCRIPTION OF THE EMBODIMENTS

The following describes the technical solutions in the embodiments of the present application in combination with the accompanying drawings in the embodiments of the present application.

It should be noted that similar reference signs and letters indicate similar items in the following drawings. Therefore, once a specific item is defined in one drawing, it does not need to be further defined and explained in the subsequent drawings. In addition, in the description of the present application, the terms "first", "second" and the like are merely intended for a purpose of description, and shall not be understood as an indication or implication of relative importance.

As stated in Background, there is signal delay in signal fusion in a plurality of vehicle-mounted devices, which is mainly reflected in signal out-of-synchronization between sensors. To solve the problem of out-of-synchronization, hard wire synchronization is currently used in most solutions: a hard wire is added for each sensor and synchronization is implemented through an electrical pulse signal. However, hardware of each sensor needs to be redesigned, making costs and difficulties of circuit cabling increased. In addition, a pulse signal is susceptible to interference and prone to false triggering, and only relative time can be synchronized.

In response to the problem in conventional technologies, the present application provides a time synchronization method for a vehicle-mounted device. According to the method, first communication data transmitted by a second vehicle-mounted device is received, a first receiving time is recorded, and coarse time alignment is performed on a first vehicle-mounted device based on data generation time in the first communication data, so that time synchronization is preliminarily implemented on the first vehicle-mounted device. After coarse time alignment is performed on the first vehicle-mounted device, second communication data transmitted by the second vehicle-mounted device is received, a second receiving time is recorded, and a synchronization time at which the first vehicle-mounted device and the second vehicle-mounted device are synchronized is determined based on the first receiving time, the second receiving time, and the data transmitting time, so that time synchronization correction is performed based on the synchronization time on the first vehicle-mounted device on which time synchronization is preliminarily implemented, thereby improving synchronization accuracy.

Embodiment 1

Figure 1:
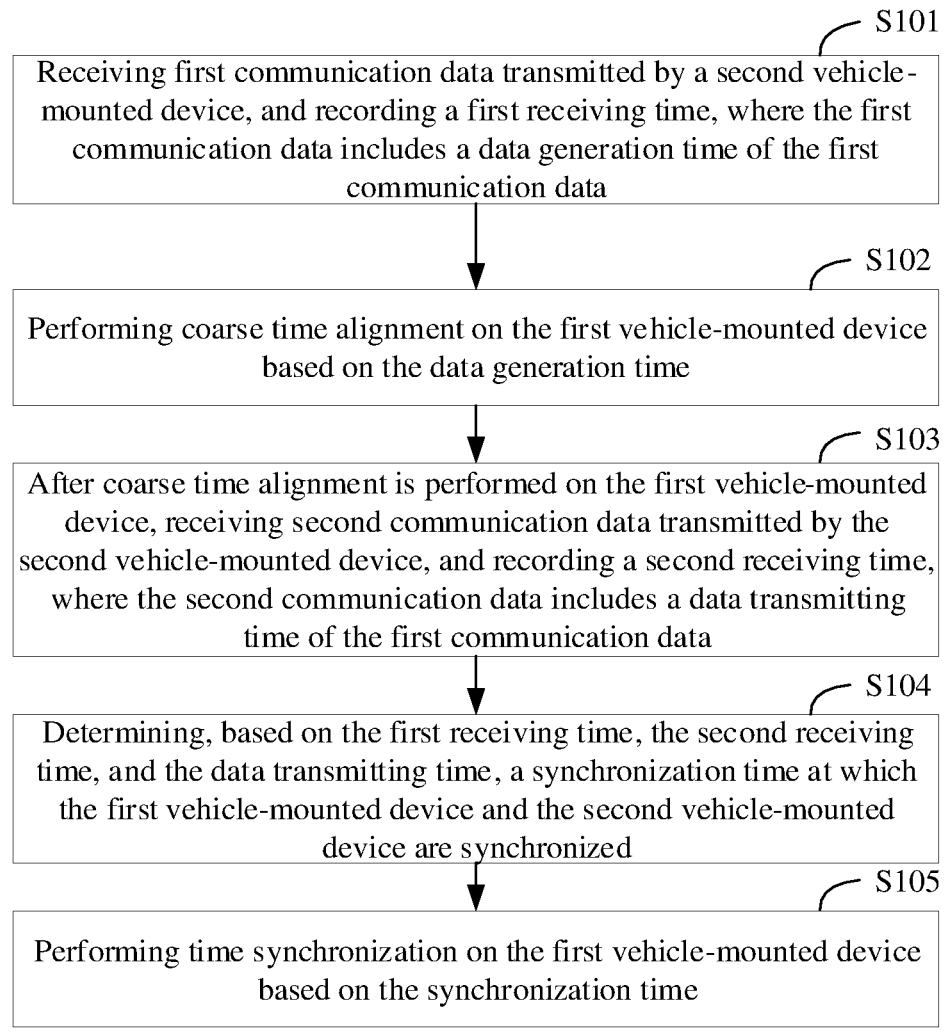
FIG. 1 is a schematic flowchart of a time synchronization method for a vehicle-mounted device according to an embodiment of the present application.

Referring to FIG. 1, FIG. 1 is an implementation flowchart of a time synchronization method for a vehicle-mounted device according to an embodiment of the present application. The time synchronization method described below in the embodiment of the present application may be applied to a first vehicle-mounted device, and the first vehicle-mounted device is in communication connection with a second vehicle-mounted device. A vehicle-mounted device includes but is not limited to a device such as a vehicle-mounted computer, a vehicle-mounted audio system, a vehicle-mounted smart rearview mirror, and a vehicle-mounted sensor. The time synchronization method in the embodiment of the present application includes Step S101 to Step S105, and details are as follows.

Step S101: Receiving first communication data transmitted by the second vehicle-mounted device, and recording a first receiving time, where the first communication data includes a data generation time of the first communication data.

In the embodiment, the first vehicle-mounted device is a synchronization device on which time synchronization needs to be performed, and the second vehicle-mounted device is a synchronization device with time used as a reference time. A communication manner between the first vehicle-mounted device and the second vehicle-mounted device may be a controller area network (CAN), a local interconnect network (LIN), an Ethernet, or the like. When the communication manner is the CAN, communication data is CAN packet data; and when the communication manner is the LIN, the communication data is SCI (UART) data. For ease of description, the CAN is used as the communication manner in the embodiment for describing and explaining the time synchronization method.

For example, the second vehicle-mounted device generates a CAN data packet CANMsg (T1) in a specific format at a time T1, where the CANMsg (T1) includes time information of the data generation time T1, and is transmitted to a mailbox of a CAN bus. Due to a CAN mechanism, it is determined that the CANMsg (T1) is not transmitted immediately, but transmitted when a bus is allowed. When the CANMsg (T1) is transmitted, the second vehicle-mounted device may record a data transmitting time T2. When receiving the CANMsg (T1), the first vehicle-mounted device records a first receiving time T1r at which the data is received.

Further, the second vehicle-mounted device may be synchronized with a reference time, and the reference time may be a universal time coordinated (UTC) time or a local time. Taking the UTC as an example, the UTC is from a global navigation satellite system (Gnss) module. After a UTC time is obtained from a packet of the Gnss module, time is reset and high-precision synchronization is performed based on pulse per second provided by the Gnss module.

Step S102: Performing coarse time alignment on the first vehicle-mounted device based on the data generation time.

In the embodiment, after the first communication data is received, a timer of the first vehicle-mounted device is assigned a value immediately, to make the timer of the first vehicle-mounted device synchronize with the data generation time to complete coarse time alignment, so as to implement subsequent precise synchronization.

Step S103: After coarse time alignment is performed on the first vehicle-mounted device, receiving second communication data transmitted by the second vehicle-mounted device, and recording a second receiving time, where the second communication data includes a data transmitting time of the first communication data.

In the embodiment, a transmission delay exists in a data transmission process, for example, transmitting of CAN data needs to be allowed by a CAN bus. Thus, the first vehicle-mounted device cannot parse out the data transmitting time of the first communication data from the first communication data when the first communication data is received. Therefore, in the embodiment, after the coarse time alignment is performed on the first vehicle-mounted device, the second vehicle-mounted device encapsulates the recorded data transmitting time T2 into specific CAN information CANMsg (T2) again. As in a process of transmitting the first communication data, CANMsg (T2) information is transmitted to the CAN bus, and is transmitted through the CAN bus after the CAN bus is allowed. When receiving the CANMsg (T2), the first vehicle-mounted device records the second receiving time T2r, and parses to obtain time information of the data transmitting time T2.

Step S104: Determining, based on the first receiving time, the second receiving time, and the data transmitting time, a synchronization time at which the first vehicle-mounted device and the second vehicle-mounted device are synchronized.

In the embodiment, based on the foregoing data receiving and transmitting process, the first vehicle-mounted device obtains the data generation time, the data transmitting time, the first receiving time, and the second receiving time. Therefore, a time difference between the first vehicle-mounted device and the second vehicle-mounted device may be obtained based on a time difference between two receiving and transmitting processes, so as to obtain a synchronization time.

In an embodiment, the determining, based on the first receiving time, the second receiving time, and the data transmitting time, a synchronization time at which the first vehicle-mounted device and the second vehicle-mounted device are synchronized includes: calculating, according to a preset calculation formula, the synchronization time at which the first vehicle-mounted device and the second vehicle-mounted device are synchronized, where the calculation formula is: Tre=(T2r−T1r)+T2, Tre is the synchronization time, T2r is the second receiving time, T1r is the first receiving time, and T2 is the data transmitting time.

In the embodiment, a time difference between the first vehicle-mounted device and the second vehicle-mounted device is calculated based on the two receiving times of the communication data, so that device hardware does not need to be changed, and device time synchronization is implemented at a low cost.

Step S105: Performing time synchronization on the first vehicle-mounted device based on the synchronization time.

In the embodiment, because the time difference between the first vehicle-mounted device and the second vehicle-mounted device is obtained in Step S104, and a synchronization time is obtained, the first vehicle-mounted device is synchronized to the synchronization time. Optionally, because a transmission delay and an interrupt delay exist in a data transmission process, to further improve synchronization accuracy, error correction is performed on the synchronization time in the embodiment.

In an embodiment, the performing time synchronization on the first vehicle-mounted device based on the synchronization time includes: performing, based on a preset Kalman filter, error correction on the synchronization time to obtain a target synchronization time; and synchronizing a time of the first vehicle-mounted device with the target synchronization time.

In the embodiment, the Kalman filter is an algorithm used to perform an optimal estimation for a system state based on system input and output observation data by using a linear system state equation. In the embodiment, the synchronization time is further corrected by using the Kalman filter, so as to correct error impact caused by the transmission delay and interrupt delay, further improve time synchronization accuracy, and improve anti-interference performance in a time synchronization process.

In an embodiment, the performing, based on a preset Kalman filter, error correction on the synchronization time to obtain a target synchronization time includes: constructing an observation vector of the Kalman filter based on the synchronization time and a clock unit of the first vehicle-mounted device; determining a state vector of the Kalman filter based on a current time, a time increment, and a preset transmission delay of the first vehicle-mounted device; and updating the synchronization time based on the observation vector and the state vector to obtain the target synchronization time.

In the embodiment, for example, an observation vector $$z_t = \begin{bmatrix} T_{re} \\ T_{sec} \end{bmatrix}$$

is established, where $T_{re}$ is a synchronization time, and $T_{sec}$ is a timing unit of a local clock. A state vector $$X_t = \begin{bmatrix} x_t \\ dx_t \\ l_t \end{bmatrix}$$

is established, where $x_t$ is a current time, $dx_t$ is a time increment of each time, and $l_t$ is a preset transmission delay. Since the interrupt delay is a fixed value, adverse impact of the interrupt delay on the synchronization time may be corrected when Tre is obtained. The observation vector and the state vector are input to the Kalman filter to update a state of the synchronization time to finally obtain the target synchronization time. In the embodiment, the current time, the time increment, and the preset transmission delay are used as state vectors to correct error impact of an interrupt delay of communication data on a synchronization time, thereby improving time synchronization accuracy.

Further, the updating the synchronization time based on the observation vector and the state vector to obtain the target synchronization time includes: calculating a state transition matrix of the Kalman filter based on the state vector; updating a covariance matrix of the state vector according to the state transition matrix; calculating a Kalman gain matrix of the Kalman filter based on the covariance matrix; and updating the synchronization time based on the observation vector and the Kalman gain matrix to obtain the target synchronization time.

In the embodiment, for example, $x_t=x_{t-1}+dx_{t-1}-l_t$, $dx_t=dx_{t-1}$, and $l_t=l_{t-1}$ may be obtained according to a time recursion, and thus it may be determined that a state transition matrix is $$F = \begin{bmatrix} 1 & 1 & -1 \\ 0 & 1 & 0 \\ 0 & 0 & 1 \end{bmatrix}$$

according to a kinematics formula of the state transition matrix; and a covariance matrix $P_t^-$ of the state vector is updated according to $P_t^-=F_{t-1}P_{t-1}^+F_{t-1}^T+Q_{k-1}$ based on the state transition matrix, where Q is a system noise. A Kalman gain matrix is calculated according to $K\ t=P_t^-H_t^T(H_tP_t^-H_t^T+R_t)^{-1}$, where R is an observation noise, and H is an observation matrix; and state update is completed according to $x_t^+=x_t^-+K_t(z_t-H_tx_t^-)$ and $P_t^+=(I-K_tH_t)P_k^-$.

In the foregoing implementation process, the observation matrix H defines a change rule of the observation vector varying with states, the synchronization time is a linear function of a local clock, and a scale and an offset of the local clock are included in a local clock error. The system noise Q may be deduced by using a simulation result and used as a preset value of the Kalman filter. The observation noise R may be considered as a correlation quantity of stability of a crystal oscillator, or may be used as a preset value of the Kalman filter. It may be learned that time information obtained by the first vehicle-mounted device by using a CAN is corrected, and a local clock deviation of the first vehicle-mounted device caused by a crystal oscillator error is also corrected.

Embodiment 2

Figure 2:
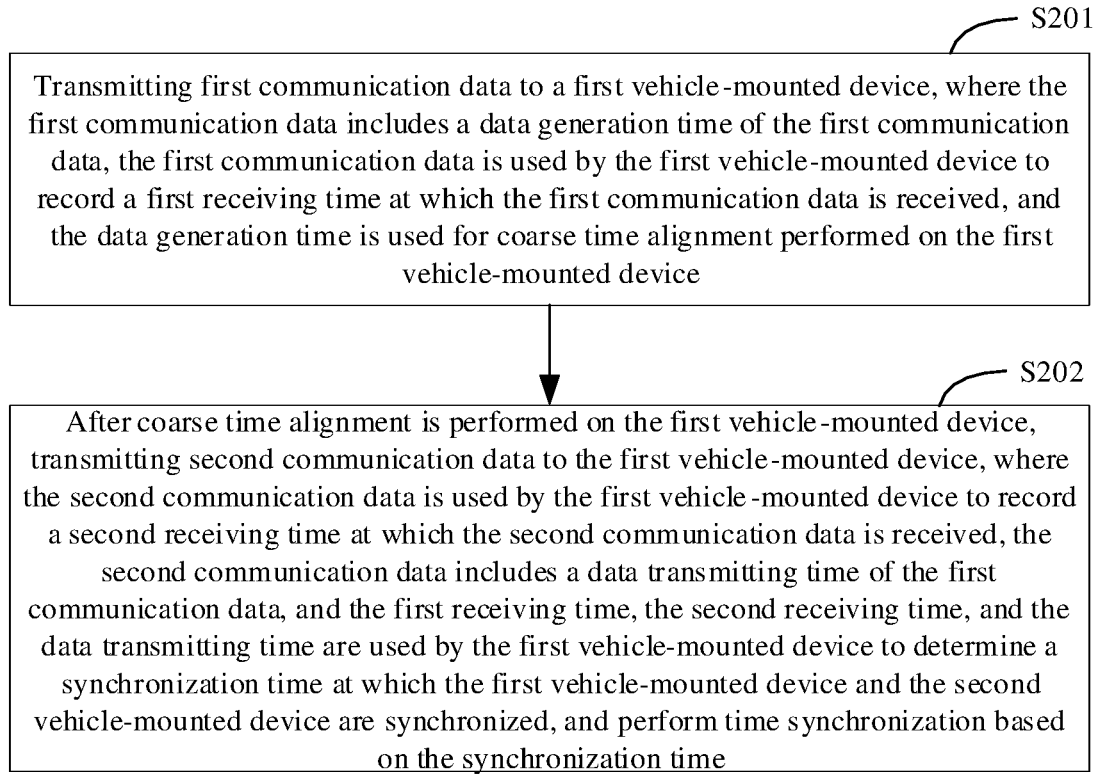
FIG. 2 is a schematic flowchart of a time synchronization method for a vehicle-mounted device according to another embodiment of the present application.

Referring to FIG. 2, FIG. 2 is an implementation flowchart of a time synchronization method for a vehicle-mounted device according to another embodiment of the present application. The following time synchronization method in the embodiment of the present application may be applied to a second vehicle-mounted device. A first vehicle-mounted device is in communication connection with the second vehicle-mounted device. A vehicle-mounted device includes but is not limited to a device such as a vehicle-mounted computer, a vehicle-mounted audio system, a vehicle-mounted smart rearview mirror, and a vehicle-mounted sensor. The time synchronization method in the embodiment of the present application includes Step S201 and Step S202, and details are as follows.

Step S201: Transmitting first communication data to the first vehicle-mounted device, where the first communication data includes a data generation time of the first communication data, the first communication data is used by the first vehicle-mounted device to record a first receiving time at which the first communication data is received, and the data generation time is used for coarse time alignment performed on the first vehicle-mounted device.

Step S202: After coarse time alignment is performed on the first vehicle-mounted device, transmitting second communication data to the first vehicle-mounted device, where the second communication data is used by the first vehicle-mounted device to record a second receiving time at which the second communication data is received, the second communication data includes a data transmitting time of the first communication data, and the first receiving time, the second receiving time, and the data transmitting time are used by the first vehicle-mounted device to determine a synchronization time at which the first vehicle-mounted device and the second vehicle-mounted device are synchronized, and perform time synchronization based on the synchronization time.

In the embodiment, the second vehicle-mounted device may implement time synchronization with a plurality of first vehicle-mounted devices, and support a single-master multi-slave mode, thereby improving time synchronization efficiency. For ease of description, for descriptions and explanations of steps related to Step S201 and Step S202, reference may be made to explanations of Step S101 to Step S105 described above. Details are not described herein again.

Embodiment 3

Figure 3:
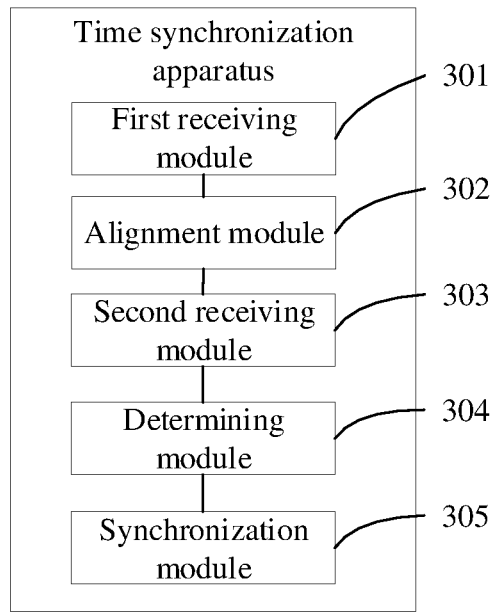
FIG. 3 is a schematic structural diagram of a time synchronization apparatus for a vehicle-mounted device according to an embodiment of the present application.

To execute the method corresponding to the foregoing method Embodiment 1 to implement corresponding functions and technical effects, the following provides a time synchronization apparatus. Referring to FIG. 3, FIG. 3 is a structural block diagram of a time synchronization apparatus for a vehicle-mounted device according to an embodiment of the present application. Each module included in the apparatus in the embodiment is configured to perform each step in the embodiment corresponding to FIG. 1. For details, reference may be made to FIG. 1 and the related description in the embodiments corresponding to FIG. 1. For ease of description, only a part related to the embodiment is shown. The time synchronization apparatus provided in the embodiment of the present application includes:

a first receiving module 301, configured to: receive first communication data transmitted by a second vehicle-mounted device, and record a first receiving time, where the first communication data includes a data generation time of the first communication data;

an alignment module 302, configured to perform coarse time alignment on the first vehicle-mounted device based on the data generation time;

a second receiving module 303, configured to: after coarse time alignment is performed on the first vehicle-mounted device, receive second communication data transmitted by the second vehicle-mounted device, and record a second receiving time, where the second communication data includes a data transmitting time of the first communication data;

a determining module 304, configured to determine, based on the first receiving time, the second receiving time, and the data transmitting time, a synchronization time at which the first vehicle-mounted device and the second vehicle-mounted device are synchronized; and a synchronization module 305, configured to perform time synchronization on the first vehicle-mounted device based on the synchronization time.

In an embodiment, the determining module 304 includes:
a calculation unit, configured to calculate, according to a preset calculation formula, the synchronization time at which the first vehicle-mounted device and the second vehicle-mounted device are synchronized, where the calculation formula is: $Tre=(T2r-T1r)+T2$, Tre is the synchronization time, $T2r$ is the second receiving time, $T1r$ is the first receiving time, and T2 is the data transmitting time.

In an embodiment, the synchronization module 305 includes:
a correction unit, configured to perform, based on a preset Kalman filter, error correction on the synchronization time to obtain a target synchronization time; and
a synchronization unit, configured to synchronize a time of the first vehicle-mounted device to a target synchronization time.

In an embodiment, the correction unit includes:
a construction subunit, configured to construct an observation vector of the Kalman filter based on the synchronization time and a clock unit of the first vehicle-mounted device;
a determining subunit, configured to determine a state vector of the Kalman filter based on a current time, a time increment, and a preset transmission delay of the first vehicle-mounted device; and
an updating subunit, configured to update the synchronization time based on the observation vector and the state vector to obtain the target synchronization time. In an embodiment, the updating subunit is specifically configured to:
calculate a state transition matrix of the Kalman filter based on the state vector;
update a covariance matrix of the state vector according to the state transition matrix;
calculate a Kalman gain matrix of the Kalman filter based on the covariance matrix; and
update the synchronization time based on the observation vector and the Kalman gain matrix to obtain the target synchronization time.

Embodiment 4

Figure 4:
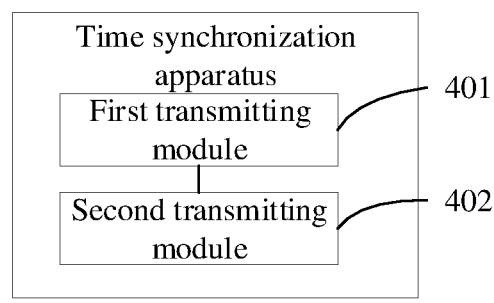
FIG. 4 is a schematic structural diagram of a time synchronization apparatus for a vehicle-mounted device according to another embodiment of the present application.

To execute the method corresponding to the foregoing method Embodiment 2 to implement corresponding functions and technical effects, the following provides a time synchronization apparatus. Referring to FIG. 4, FIG. 4 is a structural block diagram of a time synchronization apparatus for a vehicle-mounted device according to another embodiment of the present application. Each module included in the apparatus in the embodiment is configured to perform each step in the embodiment corresponding to FIG. 2. For details, reference may be made to FIG. 2 and the related description in the embodiments corresponding to FIG. 2. For ease of description, only a part related to the embodiment is shown. The time synchronization apparatus provided in the embodiment of the present application includes:
a first transmitting module 401, configured to transmit first communication data to a first vehicle-mounted device, where the first communication data includes a data generation time of the first communication data, the first communication data is used by the first vehicle-mounted device to record a first receiving time at which the first communication data is received, and the data generation time is used for coarse time alignment performed on the first vehicle-mounted device; and a second transmitting module 402, configured to: after coarse time alignment is performed on the first vehicle-mounted device, transmit second communication data to the first vehicle-mounted device, where the second communication data is used by the first vehicle-mounted device to record a second receiving time at which the second communication data is received, the second communication data includes a data transmitting time of the first communication data, and the first receiving time, the second receiving time, and the data transmitting time are used by the first vehicle-mounted device to determine a synchronization time at which the first vehicle-mounted device and a second vehicle-mounted device are synchronized, and perform time synchronization based on the synchronization time.

Embodiment 5

Figure 5:
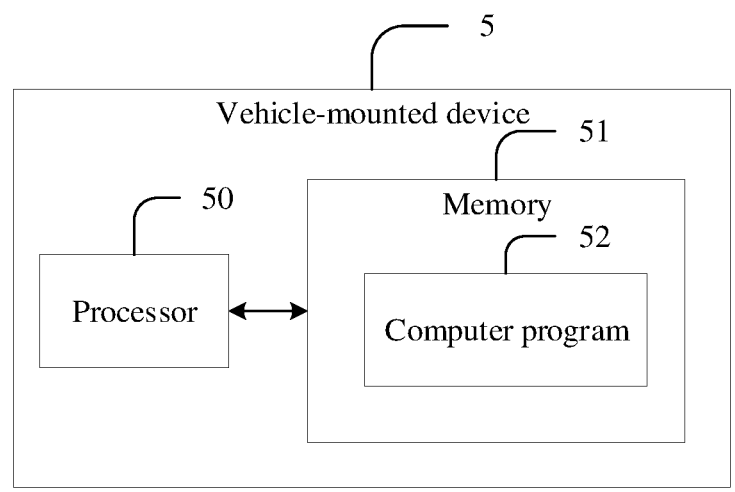
FIG. 5 is a schematic structural diagram of a vehicle-mounted device according to an embodiment of the present application.

FIG. 5 is a schematic structural diagram of a vehicle-mounted device according to an embodiment of the present application. As shown in FIG. 5, the vehicle-mounted device 5 in the embodiment includes: at least one processor 50 (only one is shown in FIG. 5); a memory 51; and a computer program 52 that is stored in the memory 51 and runs on the at least one processor 50, where when the processor 50 executes the computer program 52, the steps in any one of the foregoing method embodiments are implemented.

The vehicle-mounted device 5 may be a smart device such as a vehicle-mounted computer, a vehicle-mounted audio system, a vehicle-mounted smart rearview mirror, and a vehicle-mounted sensor. The vehicle-mounted device may include but is not limited to the processor 50 and the memory 51. A person skilled in the art may understand that FIG. 5 only shows an example of the vehicle-mounted device 5, and does not constitute a limitation on the vehicle-mounted device 5. The vehicle-mounted device 5 may include more or fewer components than those shown in the figure, or some combined components or different components. For example, the vehicle-mounted device 5 may further include an input/output device, a network access device, and the like.

The processor 50 may be a central processing unit (CPU), or may be another general-purpose processor, a digital signal processor (DSP), an application-specific integrated circuit (ASIC), a field-programmable gate array, (FPGA), or another programmable logic device, a discrete gate, a transistor logic device, a discrete hardware component, or the like. The general-purpose processor may be a microprocessor, or the processor may be any conventional processor or the like.

In some embodiments, the memory 51 may be an internal storage unit of the vehicle-mounted device 5, for example, a hard disk or a memory of the vehicle-mounted device 5. In some other embodiments, the memory 51 may be an external storage device of the vehicle-mounted device 5, for example, a plug-in hard disk, a smart media card (SMC), a secure digital (SD) card, or a flash card that is equipped on the vehicle-mounted device 5. Further, the memory 51 may alternatively include both an internal storage unit and an external storage device of the vehicle-mounted device 5. The memory 51 is configured to store an operating system, an application program, a boot loader, data, another program, and the like, for example, program codes of the computer program. The memory 51 may further be configured to temporarily store data that has been output or is to be output.

In addition, an embodiment of the present application further provides a computer-readable storage medium. The computer-readable storage medium stores a computer program. When the computer program is executed by a processor, steps in any one of the foregoing method embodiments may be implemented.

An embodiment of the present application provides a computer program product. When the computer program product runs on a vehicle-mounted device, steps in the foregoing method embodiments may be implemented when the vehicle-mounted device is executed.

In the several embodiments provided in the present application, it should be understood that the disclosed apparatus and method may be implemented in other manners. The apparatus embodiments described above are merely illustrative. For example, the flowcharts and block diagrams in the accompanying drawings show possible architectures, functions and operations of the apparatus, the method and the computer program product according to various embodiments of the present application. In this regard, each block in the flowchart or block diagram may represent a module, a program segment or a portion of a code, which contains one or more executable instructions for implementing a specified logical function. It should also be noted that in some alternative implementations, functions marked by blocks may also occur in an order different from that marked in the drawings. For example, two consecutive blocks may actually be executed substantially in parallel, or sometimes be executed in a reverse order, depending on functions involved. It should also be noted that each block in a block diagram and/or a flowchart, and combinations of blocks in the block diagrams and/or flowcharts may be implemented in a dedicated hardware-based system that performs specified functions or actions, or may be implemented by a combination of dedicated hardware and computer instructions.

In addition, the functional modules in the embodiments of the present application may be integrated together to form an independent part, or each module may exist alone, or two or more modules may be integrated to form an independent part.

If the functions are implemented in the form of software functional modules and sold or used as independent products, the functions may be stored in a computer-readable storage medium. Based on such an understanding, the technical solutions of the present application essentially, or the part contributing to the conventional technology, or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present application. The foregoing storage medium includes media that may store program code, such as a USB flash disk, a mobile hard disk, a read-only memory (ROM), a random access memory (RAM), a magnetic disk, or an optical disk.

The foregoing descriptions are merely embodiments of the present application, but are not intended to limit the protection scope of the present application. For a person skilled in the art, various changes and variations may be made in the present application. Any modification, equivalent replacement, or improvement made within the spirit and principle of the present application shall be included in the protection scope of the present application. It should be noted that similar reference signs and letters indicate similar items in the following drawings. Therefore, once a specific item is defined in one drawing, it does not need to be further defined and explained in the subsequent drawings.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application should be subject to the protection scope of the claims.

It should be noted that in this specification, relational terms such as "first" and "second" are only used to distinguish one entity or operation from another, and do not necessarily require or imply that any actual relationship or sequence exists between these entities or operations. In addition, the terms "comprise", "include" and any other variants thereof are intended to cover non-exclusive inclusion, so that a process, a method, an article, or a device that includes a series of elements not only includes these very elements, but may also include other elements not expressly listed, or also include elements inherent to this process, method, article, or device. Without being subject to further limitations, an element defined by a phrase "including one . . . " does not exclude presence of other identical elements in the process, method, article, or device that includes the element.

What is claimed is:

1. A time synchronization method for a vehicle-mounted device, applied to a first vehicle-mounted device, wherein the first vehicle-mounted device is in communication connection with a second vehicle-mounted device, and the method comprises:
receiving first communication data transmitted by the second vehicle-mounted device, and recording a first receiving time at which the first communication data is received, wherein the first communication data comprises a data generation time of the first communication data;
performing coarse time alignment on the first vehicle-mounted device based on the data generation time;
after coarse time alignment is performed on the first vehicle-mounted device, receiving second communication data transmitted by the second vehicle-mounted device, and recording a second receiving time at which the second communication data is received, wherein the second communication data comprises a data transmitting time of the first communication data;
determining, based on the first receiving time, the second receiving time, and the data transmitting time, a synchronization time at which the first vehicle-mounted device and the second vehicle-mounted device are synchronized; and
performing time synchronization on the first vehicle-mounted device based on the synchronization time.

2. The time synchronization method according to claim 1, wherein the determining, based on the first receiving time, the second receiving time, and the data transmitting time, a synchronization time at which the first vehicle-mounted device and the second vehicle-mounted device are synchronized comprises:
calculating, according to a preset calculation formula, the synchronization time at which the first vehicle-mounted device and the second vehicle-mounted device are synchronized, wherein the calculation formula is: $Tre=(T2r-T1r)+T2$, Tre is the synchronization time, T2*r* is the second receiving time, T1*r* is the first receiving time, and T2 is the data transmitting time.

3. The time synchronization method according to claim 1, wherein the performing time synchronization on the first vehicle-mounted device based on the synchronization time comprises:
performing, based on a preset Kalman filter, error correction on the synchronization time to obtain a target synchronization time; and
synchronizing a time of the first vehicle-mounted device with the target synchronization time.

4. The time synchronization method according to claim 3, wherein the performing, based on a preset Kalman filter, error correction on the synchronization time to obtain a target synchronization time comprises:
constructing an observation vector of the Kalman filter based on the synchronization time and a clock unit of the first vehicle-mounted device;
determining a state vector of the Kalman filter based on a current time, a time increment, and a preset transmission delay of the first vehicle-mounted device; and
updating the synchronization time based on the observation vector and the state vector to obtain the target synchronization time.

5. The time synchronization method according to claim 4, wherein the updating the synchronization time based on the observation vector and the state vector to obtain the target synchronization time comprises:
calculating a state transition matrix of the Kalman filter based on the state vector;
updating a covariance matrix of the state vector according to the state transition matrix;
calculating a Kalman gain matrix of the Kalman filter based on the covariance matrix; and
updating the synchronization time based on the observation vector and the Kalman gain matrix to obtain the target synchronization time.

6. A time synchronization method for a vehicle-mounted device, applied to a second vehicle-mounted device, wherein the second vehicle-mounted device is in communication connection with one or more first vehicle-mounted devices, and the method comprises:
transmitting first communication data to the first vehicle-mounted device, wherein the first communication data comprises a data generation time of the first communication data, the first communication data is used by the first vehicle-mounted device to record a first receiving time at which the first communication data is received, and the data generation time is used for coarse time alignment performed on the first vehicle-mounted device;
after coarse time alignment is performed on the first vehicle-mounted device, transmitting second communication data to the first vehicle-mounted device, wherein the second communication data is used by the first vehicle-mounted device to record a second receiving time at which the second communication data is received, the second communication data comprises a data transmitting time of the first communication data, and the first receiving time, the second receiving time, and the data transmitting time are used by the first vehicle-mounted device to determine a synchronization time at which the first vehicle-mounted device and the second vehicle-mounted device are synchronized, and perform time synchronization based on the synchronization time.

7. A vehicle-mounted device, comprising a memory and a processor, wherein the memory is configured to store a computer program, and the processor runs the computer program to cause the vehicle-mounted device to perform the time synchronization method for a vehicle-mounted device, comprising:
receiving first communication data transmitted by the second vehicle-mounted device, and recording a first receiving time at which the first communication data is received, wherein the first communication data comprises a data generation time of the first communication data;
performing coarse time alignment on the first vehicle-mounted device based on the data generation time;
after coarse time alignment is performed on the first vehicle-mounted device, receiving second communication data transmitted by the second vehicle-mounted device, and recording a second receiving time at which the second communication data is received, wherein the second communication data comprises a data transmitting time of the first communication data;
determining, based on the first receiving time, the second receiving time, and the data transmitting time, a synchronization time at which the first vehicle-mounted device and the second vehicle-mounted device are synchronized; and
performing time synchronization on the first vehicle-mounted device based on the synchronization time.

8. The vehicle-mounted device according to claim 7, wherein the determining, based on the first receiving time, the second receiving time, and the data transmitting time, a synchronization time at which the first vehicle-mounted device and the second vehicle-mounted device are synchronized comprises:
calculating, according to a preset calculation formula, the synchronization time at which the first vehicle-mounted device and the second vehicle-mounted device are synchronized, wherein the calculation formula is: Tre=(T2*r*−T1*r*)+T2, Tre is the synchronization time, T2*r* is the second receiving time, T1*r* is the first receiving time, and T2 is the data transmitting time.

9. The vehicle-mounted device according to claim 7, wherein the performing time synchronization on the first vehicle-mounted device based on the synchronization time comprises:
performing, based on a preset Kalman filter, error correction on the synchronization time to obtain a target synchronization time; and
synchronizing a time of the first vehicle-mounted device with the target synchronization time.

10. The vehicle-mounted device according to claim 9, wherein the performing, based on a preset Kalman filter, error correction on the synchronization time to obtain a target synchronization time comprises:
constructing an observation vector of the Kalman filter based on the synchronization time and a clock unit of the first vehicle-mounted device;
determining a state vector of the Kalman filter based on a current time, a time increment, and a preset transmission delay of the first vehicle-mounted device; and
updating the synchronization time based on the observation vector and the state vector to obtain the target synchronization time.

11. The vehicle-mounted device according to claim 10, wherein the updating the synchronization time based on the observation vector and the state vector to obtain the target synchronization time comprises:

calculating a state transition matrix of the Kalman filter based on the state vector;

updating a covariance matrix of the state vector according to the state transition matrix;

calculating a Kalman gain matrix of the Kalman filter based on the covariance matrix; and updating the synchronization time based on the observation vector and the Kalman gain matrix to obtain the target synchronization time.

12. A vehicle-mounted device, comprising a memory and a processor, wherein the memory is configured to store a computer program, and the processor runs the computer program to cause the vehicle-mounted device to perform the time synchronization method for a vehicle-mounted device according to claim 6.

13. A non-transitory computer-readable storage medium on which a computer program is stored, wherein when the computer program is executed by a processor, the time synchronization method for a vehicle-mounted device according to claim 1 is implemented.

14. A non-transitory computer-readable storage medium on which a computer program is stored, wherein when the computer program is executed by a processor, the time synchronization method for a vehicle-mounted device according to claim 6 is implemented.

* * * * *